US012596773B2

(12) United States Patent
Chan

(10) Patent No.: US 12,596,773 B2
(45) Date of Patent: Apr. 7, 2026

(54) COMMUNICATION CONFIDENTIALITY METHOD FOR APPLICATIONS IN COMMUNICATION CONFIDENTIALITY SYSTEMS AND COMMUNICATION SERVERS

(71) Applicant: Charles Lap San Chan, Taipei (TW)

(72) Inventor: Charles Lap San Chan, Taipei (TW)

( * ) Notice: Subject to any disclaimer, the term of this patent is extended or adjusted under 35 U.S.C. 154(b) by 118 days.

(21) Appl. No.: 18/749,054

(22) Filed: Jun. 20, 2024

(65) Prior Publication Data

US 2024/0427855 A1 Dec. 26, 2024

(30) Foreign Application Priority Data

Jun. 26, 2023 (TW) ................................. 112123705

(51) Int. Cl.
*G06F 21/16* (2013.01)

(52) U.S. Cl.
CPC .................................... *G06F 21/16* (2013.01)

(58) Field of Classification Search
CPC ...................................................... G06F 21/16
See application file for complete search history.

(56) References Cited

U.S. PATENT DOCUMENTS

| | | | | |
|---|---|---|---|---|
| 7,043,051 | B2 * | 5/2006 | Kuzmich | G06T 1/0021 |
| | | | | 713/176 |
| 7,841,014 | B2 * | 11/2010 | Sato | G06F 21/10 |
| | | | | 726/30 |
| 11,010,452 | B2 * | 5/2021 | Fells | H04L 63/10 |
| 11,062,037 | B2 * | 7/2021 | Breuer | G06F 3/067 |
| 11,507,686 | B2 * | 11/2022 | Chugunov | H04L 9/3263 |
| 11,755,695 | B2 * | 9/2023 | Liuzzo | G06F 21/16 |
| | | | | 713/176 |
| 12,095,742 | B2 * | 9/2024 | Choi | G06F 21/602 |
| 2012/0030479 | A1 * | 2/2012 | Ebihara | G06F 21/79 |
| | | | | 713/189 |
| 2012/0072729 | A1 * | 3/2012 | Winograd | H04L 63/0823 |
| | | | | 713/176 |

* cited by examiner

*Primary Examiner* — Viral S Lakhia
(74) *Attorney, Agent, or Firm* — MUNCY, GEISSLER, OLDS & LOWE, P.C.

(57) ABSTRACT

A communication confidentiality method can add a mechanism to keep information confidential to the process of sending information. The mechanism to keep information confidential can be activated or deactivated according to the requirement of a user. The mechanism to keep information confidential can also provide customized presentation for different users. In addition, the communication confidentiality method can also trace the process of leaking out confidential information data when the confidential information data are leaked out and send warning information data used for warning to the original sender and the original recipient of the confidential information data.

6 Claims, 6 Drawing Sheets

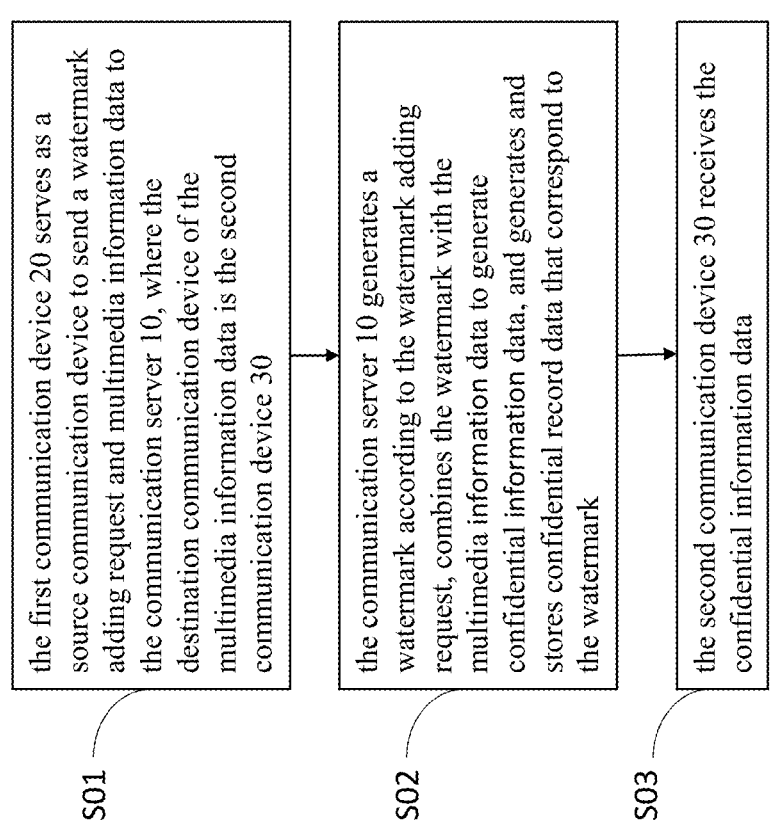

the first communication device 20 serves as a
source communication device to send a watermark
adding request and multimedia information data to
the communication server 10, where the
destination communication device of the
multimedia information data is the second
communication device 30 the communication server 10 generates a
watermark according to the watermark adding
request, combines the watermark with the
multimedia information data to generate
confidential information data, and generates and
stores confidential record data that correspond to
the watermark the second communication device 30 receives the
confidential information data

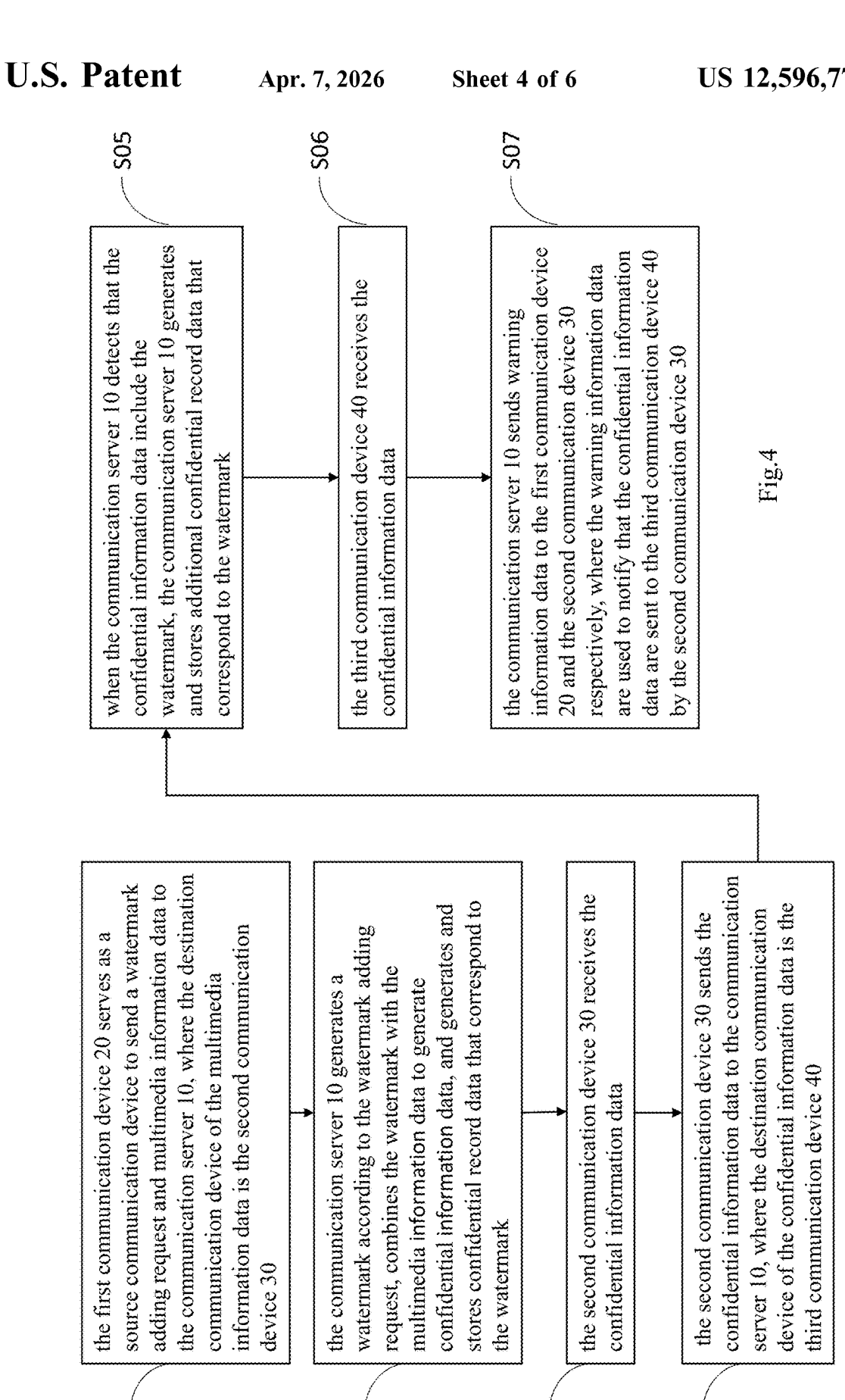

S01 — the first communication device 20 serves as a source communication device to send a watermark adding request and multimedia information data to the communication server 10, where the destination communication device of the multimedia information data is the second communication device 30

S02 — the communication server 10 generates a watermark according to the watermark adding request, combines the watermark with the multimedia information data to generate confidential information data, and generates and stores confidential record data that correspond to the watermark S03 — the second communication device 30 receives the confidential information data S04 — the second communication device 30 sends the confidential information data to the communication server 10, where the destination communication device of the confidential information data is the third communication device 40

S05 — when the communication server 10 detects that the confidential information data include the watermark, the communication server 10 generates and stores additional confidential record data that correspond to the watermark S06 — the third communication device 40 receives the confidential information data S07 — the communication server 10 sends warning information data to the first communication device 20 and the second communication device 30 respectively, where the warning information data are used to notify that the confidential information data are sent to the third communication device 40 by the second communication device 30

Fig.4

COMMUNICATION CONFIDENTIALITY METHOD FOR APPLICATIONS IN COMMUNICATION CONFIDENTIALITY SYSTEMS AND COMMUNICATION SERVERS

BACKGROUND OF THE INVENTION

This application claims priority for the TW patent application No. 112123705 filed on 26 Jun. 2023, the content of which is incorporated by reference in its entirely.

FIELD OF THE INVENTION

The present invention relates to a communication method, particularly to a communication method that can add a mechanism that keeps information confidential to the process of sending information.

DESCRIPTION OF THE RELATED ART

Communication software plays a decisive role in today's society. It provides people with a way to communicate in real time, which not only improves work efficiency, but also facilitates interpersonal communication. However, the wide application of this type of software makes the security and confidentiality of information become an extremely important issue.

In the past technology, communication content between users mainly relied on network transmission, which posed a great threat to the security of information. Users of communication software may leak confidential information data in the communication software to others without knowing it. For example, the user's communication device is stolen by a malicious person and the confidential information is forwarded to a third party. For another example, the confidential information data on the user's communication device is deliberately copied by a malicious person and then forwarded to a third party.

In order to solve the problem with leaking out information in communication software, developers and researchers have been seeking more effective confidentiality methods. For example, some technologies focus on enhancing user authentication and permission control to ensure that only authorized users can view communication contents. However, these methods still have shortcomings, such as possible difficulties in user management and permission assignment as well as the potential risk of human error.

Therefore, on the basis of the existing technology, there is still a demand for more secure, reliable and easy-to-manage confidentiality technology of communication software. This technology should be able to more effectively protect user information from snooping by unauthorized third parties and reduce the risk of information outflow and confidential leakage.

In view of this, how to efficiently transfer information between different users on communication software when taking into account the security and confidentiality of the information has become a research direction that those skilled in the art are committed to.

SUMMARY OF THE INVENTION

The primary objective of the present invention is to provide a communication confidentiality method, which optionally adds a mechanism to keep information confidential during the process of sending information.

Another objective of the present invention is to provide a communication confidentiality method, wherein the mechanism to keep information confidential can also provide customized presentation for different users.

Further objective of the present invention is to provide a communication confidentiality method that can also trace the process of leaking out confidential information data when the confidential information data are leaked out and send warning information data used for warning to the original sender and the original recipient of the confidential information data.

To achieve the abovementioned objectives, the present invention provides a communication confidentiality method applied to a communication confidentiality system having a first communication device, a second communication device, and a communication server. The first communication device, the second communication device, and the communication server are installed with software. The first communication device and the second communication device are electrically connected to the communication server. The method includes:

Step (A): by the first communication device, sending a watermark adding request and multimedia information data to the communication server, wherein the destination communication device of the multimedia information data is the second communication device;

Step (B): by the communication server, generating a watermark according to the watermark adding request, combining the watermark with the multimedia information data to generate confidential information data, and generating and storing confidential record data that correspond to the watermark and include one of the first user account of the first communication device, the second user account of the second communication device, the date of sending the watermark adding request, and the time of sending the adding watermark request or a combination of these; and Step (C): by the second communication device, receiving the confidential information data.

The present invention provides a communication confidentiality method applied to a communication server. The communication confidentiality method includes:

Step (A): receiving a watermark adding request and multimedia information data from a source communication device, wherein the multimedia information data are later sent to the destination communication device;

Step (B): generating a watermark according to the watermark adding request, combining the watermark with the multimedia information data to generate confidential information data, and generating and storing confidential record data that correspond to the watermark and include one of the first user account of the source communication device, the second user account of the destination communication device, the date of sending the watermark adding request, and the time of sending the adding watermark request or a combination of these; and Step (C): sending the confidential information data to the destination communication device.

The features, advantages, or similar expressions mentioned in the specification do not mean that all the features and advantages that can be realized by the present invention should be in any single specific embodiment of the present invention. Rather, it should be understood that the expression of related features and advantages means that the specific features, advantages, or characteristics described in conjunction with specific embodiments are included in at least one specific embodiment of the present invention. Therefore, the discussion of features and advantages, and similar expressions in the specification is related to the same specific embodiment, but it is not necessary.

Below, the embodiments are described in detail in cooperation with the drawings to make easily understood the technical contents, characteristics and accomplishments of the present invention.

BRIEF DESCRIPTION OF THE DRAWINGS

FIG. 2 is a flowchart of a communication confidentiality method according to a first preferred embodiment of the present invention;

FIG. 4 is a flowchart of a communication confidentiality method according to a second preferred embodiment of the present invention;

DETAILED DESCRIPTION OF THE INVENTION

In order to make the description of the present disclosure more detailed and complete, the following provides an illustrative description for the implementation aspects and specific embodiments of the present invention; but this is not the only way to implement or use specific embodiments of the present invention. The implementation manners cover the characteristics of a number of specific embodiments and the steps and sequences of the method used to construct and operate these specific embodiments. However, other specific embodiments can also be used to achieve the same or equal functions and sequence of steps.

It should be noted that, unless otherwise specified, all functions described herein may be implemented in hardware or used as software instructions that enable a computer to perform predetermined operations, wherein the software instructions are implemented in a computer-readable storage media, such as a random-access memory (RAM), a hard disk drive, a flash memory, or other types of a computer-readable storage media known to those skilled in the art. In some embodiments, the predetermined operations of the computer are performed by a processor, such as a computer, or performed by program codes such as computer program codes or program codes of software or firmware. In some embodiments, the predetermined operations of the computer are performed by integrated circuits encoded to perform these functions. Furthermore, it should be understood that various operations described herein as being performed by a user may be performed manually by the user, or may be automatically performed with or without instructions provided by the user.

The present invention provides a communication confidentiality method that can add a mechanism to keep information confidential to the process of sending information. The mechanism to keep information confidential can be activated or deactivated according to the requirement of a user. The mechanism to keep information confidential can also provide customized presentation for different users. In addition, the communication confidentiality method of the present invention can also trace the process of leaking out confidential information data when the confidential information data are leaked out and send warning information data used for warning to the original sender and the original recipient of the confidential information data.

Figure 1:
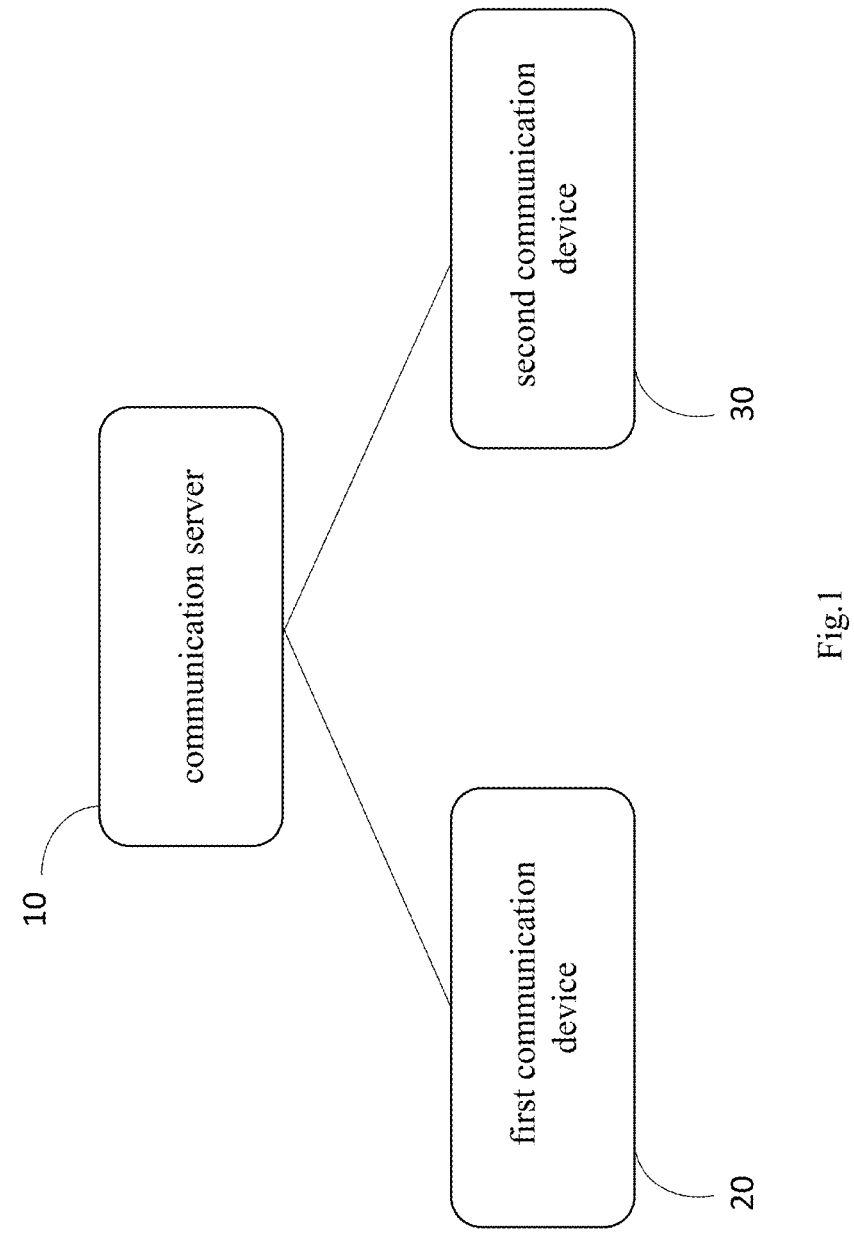
FIG. 1 is a schematic diagram illustrating a communication confidentiality system according to a first preferred embodiment of the present invention.

FIG. 1 is a schematic diagram illustrating a communication confidentiality system according to a first preferred embodiment of the present invention. The purposes of each device in the system and the functional units therein are firstly explained as follows and the operation process of the system is then explained. In FIG. 1, the system has a communication server 10, a first communication device 20, and a second communication device 30 installed with software. The first communication device 20 and the second communication device 30 can be electrically connected to the communication server 10 via a network.

The first communication device 20 and the second communication device 30 are independent electronic devices, such as mobile devices, notebook computers, desktop computers, tablet computers, smart phones, etc. The first communication device 20 or the second communication device 30 can send a watermark adding request and multimedia information data to the communication server 10. In addition, when the first communication device 20 or the second communication device 30 sends the watermark adding request to the communication server 10, the watermark adding request is configured to display only the multimedia information data on a destination communication device (i.e., the destination communication device will receive the watermark, but the watermark is invisible to the human eye) or to display both the watermark and the multimedia information data on a destination communication device (i.e., the watermark is visible to the human eye). In other words, one chooses to hide or not hide the watermark.

In an embodiment of the present invention, the manner of adding a watermark can be, for example, adding a background picture in the conversation window of the communication software and then adding a text watermark, a picture mask watermark, or a transparent watermark to the background picture, but the present invention is not limited to the manner of adding a watermark. Take some watermarks as examples. Text Watermark: this is one of the simplest and most common watermarking techniques. It involves adding text to a picture, such as copyright information, owner names, or any other identifying information. The text watermark is usually placed at the corners or bottom of the picture and made transparent to reduce its visibility. Picture Mask Watermark: the technique uses a transparent picture mask to hide a watermark. The picture mask is usually a picture with a complex texture or pattern. The picture and the original picture are computed to embed the watermark information into the pixel values. The watermark can only be displayed when the mask picture is applied to the original picture. Transparent watermark: the technique adds a watermark with low transparency to a picture. The transparent watermark is usually a picture or a text whose transparency has been adjusted so that it is almost invisible. It can be distributed evenly on the entire picture or distributed adaptively based on the content of the picture.

In embodiments of the present invention, the manner of hiding the watermark may be, for example, applying frequency domain technology, weight adjusting technology, or spatial domain technology, but the present invention is not limited thereto. The frequency domain technology embeds the watermark into the frequency domain of the picture, such as making small changes in the high-frequency area of the picture. This technology makes the watermark virtually invisible based on the human eye's insensitivity to high-frequency details. The watermark can only be extracted when specific decoding operations are performed. The weight adjusting technology usually adjusts visible or invisible pixel values to hide watermarks. This technology subtly adjusts pixel values to new values that contain watermark information and minimizes the difference between the new values and the original pixel values. This way not only ensures that the visual quality of the picture is not significantly affected and but also prevents from detecting the watermark. The spatial domain technology embeds the watermark into the pixels of the picture, usually using visually imperceptible changes to hide the watermark. The changes include adjustments for small brightness or color, subtle geometric transformations, etc. Because these changes are so small, the presence of a watermark is usually not detected by the human eye unless specific detecting and decoding processes are performed.

The communication server 10 can generate a watermark according to the received watermark adding request and combine the watermark with the received multimedia information data to generate confidential information data. The communication server 10 can also generate and store confidential record data that correspond to the generated watermark. The confidential record data can include the data of the source communication device for transmitting multimedia information data, the data of the destination communication device for receiving multimedia information data, and data related to the watermark. In an embodiment of the present invention, the confidential record data may include, for example, one of the first user account of the first communication device 20, the second user account of the second communication device 30, the date of sending the watermark adding request, and the time of sending the adding watermark request or a combination of these. It should be understood that the present invention is not limited thereto.

In addition, the communication server 10 can generate a watermark based on the data of the user account of the source communication device or the destination communication device or specific texts or numbers inputted by users. For example, in one embodiment of the present invention, the communication server 10 generates a watermark based on the data of the first user account of the first communication device 20. The data of the first user account may include one of the username of the first user account, the user number of the first user account, the work department of the first user account, and the company name of the first user account or a combination of these. In another embodiment of the present invention, the communication server 10 generates a watermark based on the data of the first user account and the second user account of the first communication device 20 and the second communication device 30. The data of the first user account and the second user account may include the usernames of the first user account and the second user account, the user numbers of the first user account and the second user account, the work departments of the first user account and the second user account, the company names of the first user account and the second user account, or a combination of these. In yet another embodiment of the present invention, the communication server 10 can also receive specific texts and numbers sent by the first communication device 20 to generate a watermark.

It should be understood that the present invention is not limited to the manner of generating the watermark.

When the communication server 10 sends any information data, the communication server 10 will detect whether the information data are confidential information data including a watermark. If the sent data are confidential information data, the communication server 10 will generate and store additional confidential record data. The additional confidential record data correspond to the foregoing watermark. The additional confidential record data include one of the user account of the source communication device for sending the confidential information data, the user account of the destination communication device for receiving the confidential information data, the date of sending the confidential information data, and the time of sending the confidential information data or a combination of these. In other words, when the communication server 10 detects that the confidential information data are resent, the relevant data will be recorded in the additional confidential record data, which is helpful in subsequently inquiring the process of leaking out the confidential information data. In addition, when the communication server 10 detects that the confidential information data including the watermark are resent, the communication server 10 will query the user account of the source communication device that sends the confidential information data recorded in the confidential record data corresponding to the watermark and the user account of the destination communication device for receiving the confidential information data. Then, the communication server 10 selectively sends warning information data to the foregoing source communication device or destination communication device. In this way, the source communication device or the destination communication device that originally sends and receives the confidential information data can be informed of the possible outflow of the confidential information data.

From the foregoing description, it should be understood that generating and adding a watermark is a mechanism for the confidential information of the present invention. This mechanism for confidential information can be activated or deactivated according to whether to send a watermark adding request. The mechanism of confidential information can also provide customized presentation for different users. That is to say, the communication server 10 can generate watermarks based on the data of the user account of the source communication device or the destination communication device or the specific texts and numbers inputted by users.

Please refer to FIG. 2. FIG. 2 is a flowchart of a communication confidentiality method according to a first preferred embodiment of the present invention. Please refer to FIG. 1 and FIG. 2 simultaneously. For the following description, the purpose of each device will be described in detail in the flowchart. It should be understood that the order of steps in the flowchart can be adaptable according to different requirements and that some of the steps can be omitted.

Firstly, in Step S01, the first communication device 20 serves as a source communication device to send a watermark adding request and multimedia information data to the communication server 10, where the destination communication device of the multimedia information data is the second communication device 30. For example, in one embodiment of the present invention, the user operates the first communication device 20 and logs in to the first user account. The data of the first user account may include, but are not limited to, one of the username of the first user account, the user number of the first user account, the work department of the first user account, and the company name of the first user account or a combination of these. In addition, the user can further configure the watermark adding request to display only the multimedia information data on the second communication device 30 (the watermark is invisible to the human eye) or to display both the watermark and the multimedia information data on the second communication device 30. In other words, one can choose to hide or not hide the watermark.

In Step S02, the communication server 10 generates a watermark according to the watermark adding request, combines the watermark with the multimedia information data to generate confidential information data, and generates and stores confidential record data that correspond to the watermark. In one embodiment, the confidential record data may include, but are not limited to, one of the first user account of the first communication device 20, the second user account of the second communication device 30, the date of sending the watermark adding request, and the time of sending the watermark adding request or a combination of these, but the present invention is not limited thereto.

In the present invention, a watermark and multimedia information data are combined to generate confidential information data. For example, a background picture can be added to the conversation window of the communication software. Afterwards, a watermark can be added to the background picture and then the multimedia information data displayed on the background picture with the watermark constitutes confidential information data. In another embodiment of the present invention, the communication server 10 may convert the multimedia information data into a picture and then add a watermark to the picture to form confidential information data. Likewise, the present invention is not limited to the manner of combining a watermark and multimedia information data to generate confidential information data. As mentioned above, the manner of adding a watermark may include, but is not limited to, adding a text watermark, a picture mask watermark, or a transparent watermark. The manner of hiding the watermark may include, but is not limited to, applying frequency domain technology, weight adjusting technology, or spatial domain technology. It should be understood that the present invention is not limited to the manner of adding a watermark or hiding a watermark.

In Step S03, the second communication device 30 receives the confidential information data. For example, a user operates the communication software of the second communication device 30 to receive and display confidential information data that combines a watermark and multimedia information data. As mentioned above, in one embodiment, a background picture with a watermark added thereto is displayed in the conversation window of the communication software of the second communication device 30. The multimedia information data sent by the first communication device 20 are displayed on the background picture with the watermark. In another embodiment, the conversation window of the communication software of the second communication device 30 will display the multimedia information data that has been converted into a picture, wherein a watermark has been added to the picture of the multimedia window data. It should be understood that the watermark in the confidential information data displayed on the second communication device 30 may be hidden or not hidden according to the configurations of the watermark adding request.

From the FIG. 2 and the description of the embodiment, it can be understood that the user of the first communication device 20 can send a watermark adding request and multimedia information data to the communication server 10 when the user of the first communication device 20 has a need for confidentiality. The request may further be configured to display only the multimedia information data on the second communication device 30 or to display both the watermark and the multimedia information data on the second communication device 30. The communication server 10 generates a watermark according to the watermark adding request and combines the watermark with the multimedia information data to generate confidential information data. The communication server 10 will also generate and store confidential record data. Finally, the second communication device 30 receives the confidential information data. The confidential information data include the watermark and the multimedia information data. The watermark in the confidential information data may be displayed or hidden.

Figure 3:
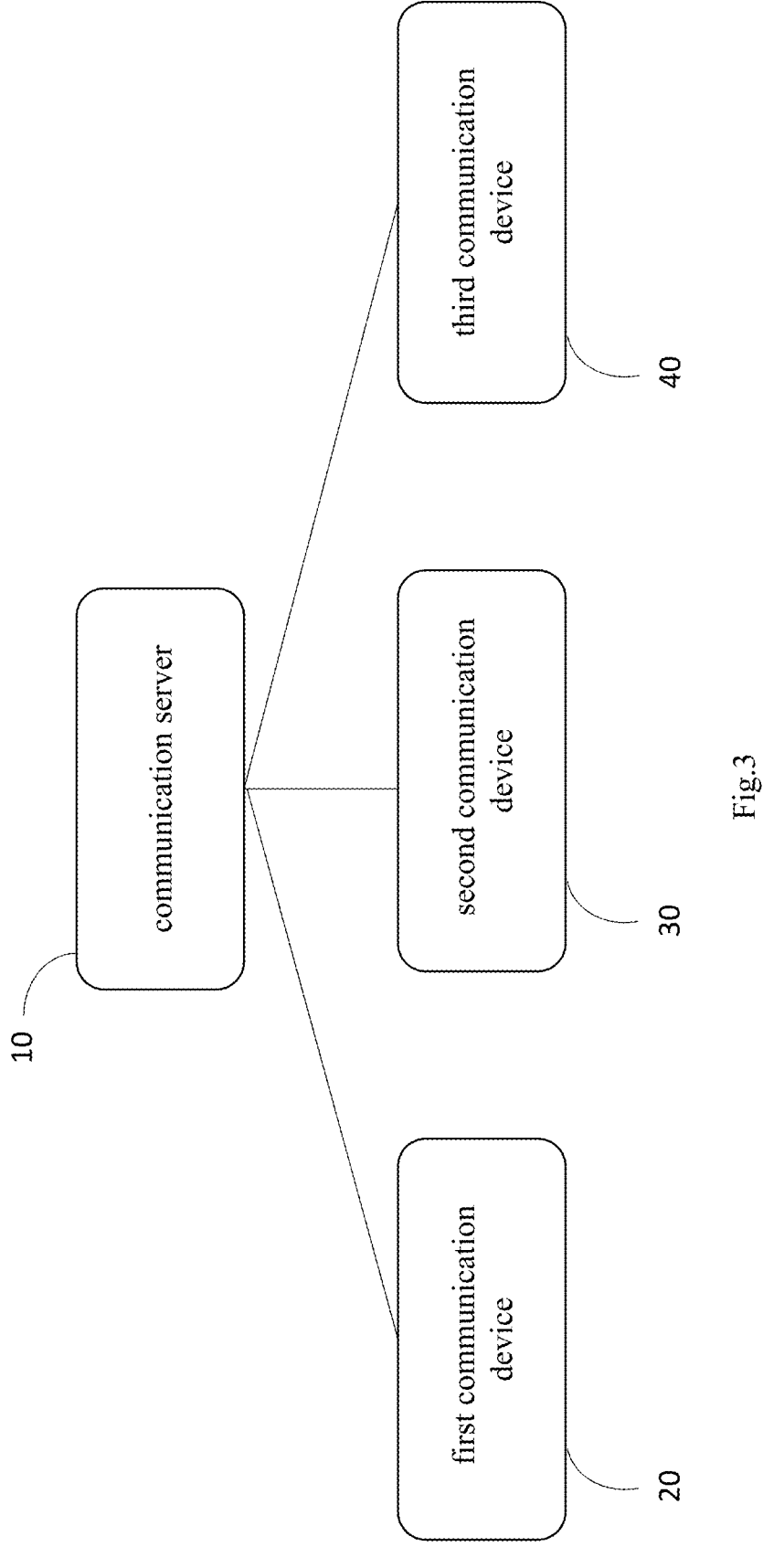
FIG. 3 is a schematic diagram illustrating a communication confidentiality system according to a second preferred embodiment of the present invention.

Please refer to FIG. 3 and FIG. 4. FIG. 3 is a schematic diagram illustrating a communication confidentiality system according to a second preferred embodiment of the present invention. FIG. 4 is a flowchart of a communication confidentiality method according to a second preferred embodiment of the present invention. In the second preferred embodiment, the processing method will be explained when the confidential information data are leaked out.

In FIG. 3, the system includes a communication server 10, a first communication device 20, a second communication device 30, and a third communication device 40 that are installed with software. The first communication device 20, the second communication device 30, and the third communication device 40 can be electrically connected to the communication server 10 via a network. The first communication device 20, the second communication device 30, and the third communication device 40 are all independent electronic devices, such as mobile devices, notebook computers, desktop computers, tablet computers, or smart phones, etc. FIG. 4 includes Steps S01-S07, where Steps S01-S03 are the same as Steps S01-S03 in FIG. 2 so it will not be reiterated. Steps S04-S07 will be described as follows.

In Step S04, the second communication device 30 sends the confidential information data to the communication server 10, where the destination communication device of the confidential information data is the third communication device 40. From Step S04, it can be seen that the second communication device 30 intends to send the confidential information data to the third communication device 40. However, the user of the second communication device 30 may arbitrarily send the confidential information data to the third communication device 40 with the consent of the user of the first communication device 20 or without the consent of the user of the first communication device 20.

In Step S05, when the communication server 10 detects that the confidential information data include the watermark, the communication server 10 generates and stores additional confidential record data that correspond to the watermark. The additional confidential record data include, but are not limited to, one of the second user account of the second communication device 30, the third user account of the third communication device 40, the date of sending the confidential information data, and the time of sending the confidential information data or a combination of these.

In Step S05, the communication server 10 detects whether the confidential information data include the watermark. For example, picture feature extraction or watermark template matching can be used to detect, but the present invention is not limited thereto. Picture feature extraction can use a picture feature extraction algorithm to extract visual features in pictures. These features can include edges, textures, color bars, etc. By comparing the features extracted from the pictures with the features of known watermarks, it can be determined whether the picture includes a specific watermark. Watermark template matching uses a template matching algorithm to find the matching area in a picture when there is already a template picture with a specific watermark. Based on the brightness and color information of the picture, template matching searches for areas in the picture that match the template. If the matching result reaches a certain critical value, it can be determined that there is a watermark in the picture. After the communication server 10 detects and obtains the watermark, the communication server 10 generates and stores additional confidential record data that correspond to the watermark.

In Step S06, the third communication device 40 receives the confidential information data. In this step, the third communication device 40 receives the confidential information data sent from the second communication device 30. However, the confidential information data are transmitted from the first communication device 20 to the second communication device 30, but the user of the second communication device 30 may arbitrarily transfer the confidential information data to the third communication device 40 without the consent of the user of the first communication device 20.

In Step S07, the communication server 10 sends warning information data to the first communication device 20 and the second communication device 30 respectively, where the warning information data are used to notify that the confidential information data are sent to the third communication device 40 by the second communication device 30. Since the communication server 10 detects that the confidential information data include the watermark in the foregoing steps and the communication server 10 stores the confidential record data and additional confidential record data related to the watermark, the communication server 10 can query the confidential information data are sent from the first communication device 20 to the second communication device 30 and then sent to the third communication device 40 by the second communication device 30. Therefore, the communication server 10 can send warning information data to the first communication device 20 and the second communication device 30 respectively, so as to notify the user of the first communication device 20 and remind the user of the second communication device 30.

From the foregoing description, it can be seen that the communication server 10 of the present invention can query the confidential record data and the additional confidential record data corresponding to the watermark to obtain the information of the original sender of the confidential information data, the information of the original recipient of the confidential information data, and the information of the recipient of the leaked confidential information data when the confidential information data are forwarded to a third party by the recipient. When necessary, warning information data can be sent to the original sender and the original recipient of the confidential information data respectively for warning purposes.

Figure 5:
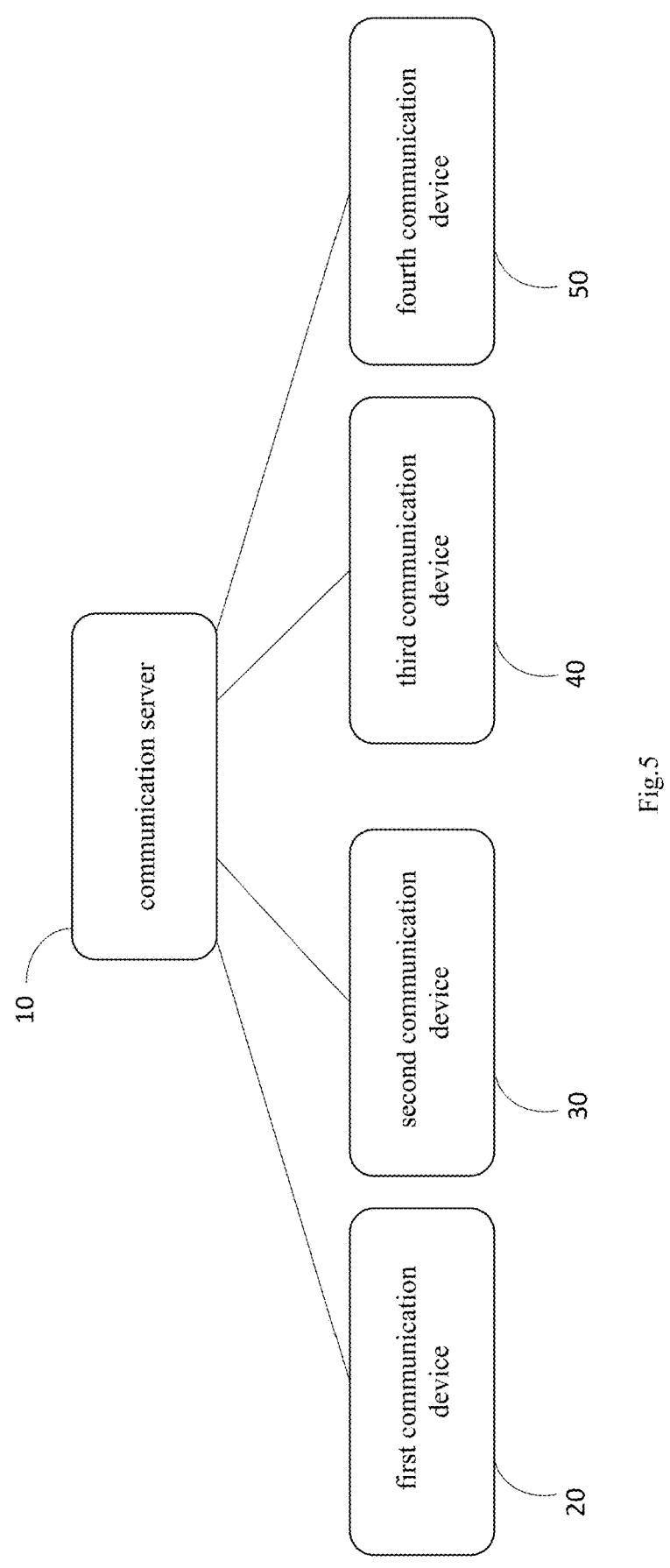
FIG. 5 is a schematic diagram illustrating a communication confidentiality system according to a third preferred embodiment of the present invention.
Figure 6:
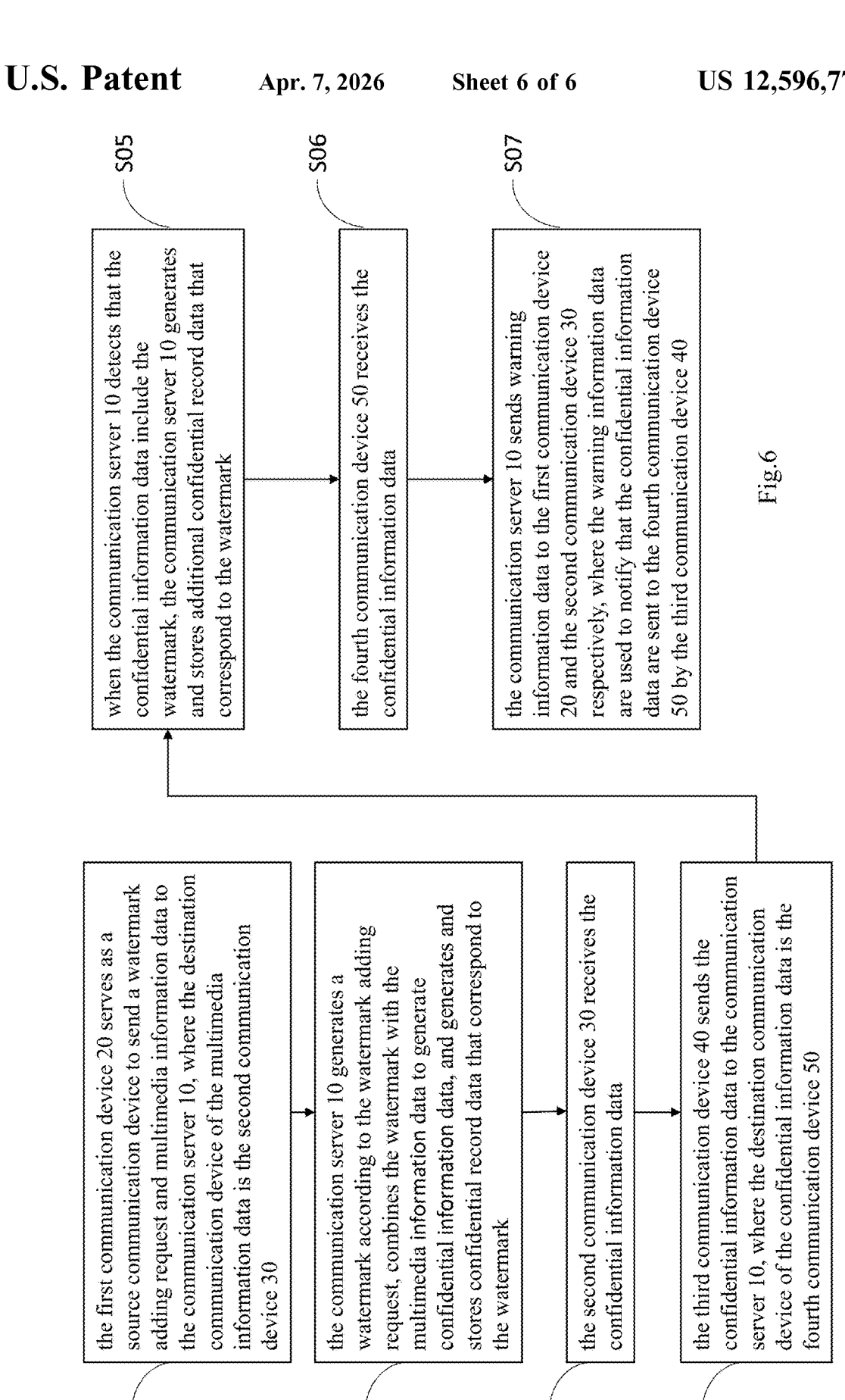
FIG. 6 is a flowchart of a communication confidentiality method according to a third preferred embodiment of the present invention.

Please refer to FIG. 5 and FIG. 6. FIG. 5 is a schematic diagram illustrating a communication confidentiality system according to a third preferred embodiment of the present invention. FIG. 6 is a flowchart of a communication confidentiality method according to a third preferred embodiment of the present invention. In the third preferred embodiment, another example of leaking out confidential information data is explained.

In FIG. 5, the system includes a communication server 10, a first communication device 20, a second communication device 30, a third communication device 40, and a fourth communication device 50 that are installed with software. The first communication device 20, the second communication device 30, the third communication device 40, and the fourth communication device 50 can be electrically connected to the communication server 10 via a network. The first communication device 20, the second communication device 30, the third communication device 40, and the fourth communication device 50 are all independent electronic devices, such as mobile devices, notebook computers, desktop computers, tablet computers, or smart phones, etc. FIG. 6 includes Steps S01-S07, where Steps S01-S03 are the same as Steps S01-S03 in FIG. 2 so it will not be reiterated. Steps S04-S07 will be described as follows.

In Step S04, the third communication device 40 sends the confidential information data to the communication server 10, where the destination communication device of the confidential information data is the fourth communication device 50. From Step S04, it can be seen that the third communication device 40 intends to send the confidential information data to the fourth communication device 50. In the embodiment, the user of the third communication device 40 may, for example, use the third communication device 40 to take a picture of the screen of the second communication device 30 when the user of the second communication device 30 distracts attention or temporarily leaves away. The screen may include the confidential information data.

In Step S05, when the communication server 10 detects that the confidential information data include the watermark, the communication server 10 generates and stores additional confidential record data that correspond to the watermark. The additional confidential record data include, but are not limited to, one of the third user account of the third communication device 40, the fourth user account of the fourth communication device 50, the date of sending the confidential information data, and the time of sending the confidential information data or a combination of these. As mentioned above, in Step S05, the communication server 10 will detect whether the confidential information data includes the watermark. For example, picture feature extraction or watermark template matching may be used to detect. After the communication server 10 detects and obtains the watermark, the communication server 10 generates and stores the additional confidential record data that correspond to the watermark.

In Step S06, the fourth communication device 50 receives the confidential information data. In this step, the fourth communication device 50 receives the confidential information data sent from the third communication device 40. Wherein, the confidential information data are transmitted from the first communication device 20 to the second communication device 30, but the user of the third communication device 40 may arbitrarily take a picture of the screen of the second communication device 30 without the consent of the user of the second communication device 30 and transfer the confidential information included in the picture to the fourth communication device 50.

In Step S07, the communication server 10 sends warning information data to the first communication device 20 and the second communication device 30 respectively, where the warning information data are used to notify that the confidential information data are sent to the fourth communication device 50 by the third communication device 40. Since the communication server 10 detects that the confidential information data include the watermark in the foregoing steps and the communication server 10 stores the confidential record data and additional confidential record data related to the watermark, the communication server 10 can query the confidential information data are sent from the first communication device 20 to the second communication device 30 and then sent to the fourth communication device 50 by the third communication device 40. Therefore, the communication server 10 can send warning information data to the first communication device 20 and the second communication device 30 respectively, so as to notify the users of the first communication device 20 and the second communication device 30.

From the foregoing description, it can be seen that the communication server 10 of the present invention can query the confidential record data and the additional confidential record data corresponding to the watermark to obtain the information of the original sender of the confidential information data, the information of the original recipient of the confidential information data, and the information of the sender and the recipient of the leaked confidential information data when the confidential information data are forwarded by a third party to a fourth party without the knowledge of either the sender or the receiver. When necessary, warning information data can be sent to the original sender and the original recipient of the confidential information data respectively for warning purposes.

According to the forgoing embodiments, it is understood that the present invention provides a communication confidentiality method that can add a mechanism to keep information confidential to the process of sending information. The mechanism to keep information confidential can be activated or deactivated according to the requirement of a user. The mechanism to keep information confidential can also provide customized presentation for different users. In addition, the communication confidentiality method of the present invention can also trace the process of leaking out confidential information data when the confidential information data are leaked out and send warning information data used for warning to the original sender and the original recipient of the confidential information data.

Although various examples of the disclosed technology have been described above, it should be understood that these examples have been presented by examples rather than limited. Likewise, various drawings may depict example architectures or other configurations of the disclosed technology. The drawings may be depicted to assist in understanding the features and functionality that may be included in the disclosed technology. The disclosed technology is not limited to the illustrated example architectures or configurations, but the desired features can be implemented using a variety of alternative architectures and configurations. In fact, it will be obvious to those skilled in the art to know how to implement alternative functionalities, logical or physical partitions and configurations to implement the required features of the technology disclosed in this article. In addition, with regard to flowcharts, operation descriptions, and methodological technical solutions, the order in which the steps are presented herein should not require that the disclosed technologies be implemented in the same order to perform the listed functionality, unless the context dictates otherwise.

What is claimed is:

1. A communication confidentiality method applied to a communication confidentiality system having a first communication device, a second communication device, and a communication server, the first communication device, the second communication device, and the communication server installed with software, the first communication device and the second communication device electrically connected to the communication server, and the method comprising:

Step (A): by the first communication device, sending a watermark adding request and multimedia information data to the communication server, wherein a destination communication device of the multimedia information data is the second communication device;

Step (B): by the communication server, generating a watermark according to the watermark adding request, combining the watermark with the multimedia information data to generate confidential information data, and generating and storing confidential record data that correspond to the watermark and comprise one of a first user account of the first communication device, a second user account of the second communication device, a date of sending the watermark adding request, and time of sending the adding watermark request or a combination of these; and Step (C): by the second communication device, receiving the confidential information data, wherein the communication confidentiality system further comprises a third communication device that perform steps comprising:

Step (D): by the second communication device, sending the confidential information data to the communication server, wherein a destination communication device of the confidential information data is the third communication device;

Step (E): when the communication server detects that the confidential information data comprises the watermark, the communication server generates and stores additional confidential record data that correspond to the watermark and comprise one of the second user account of the second communication device, a third user account of the third communication device, a date of sending the confidential information data, and time of sending the confidential information data or a combination of these; and Step (F): by the third communication device, receiving the confidential information data.

2. The communication confidentiality method according to claim 1, wherein in Step (B), the communication server generates the watermark based on data of the first user account that comprise one of a username of the first user account, a user number of the first user account, a work department of the first user account, and a company name of the first user account or a combination of these.

3. The communication confidentiality method according to claim 1, wherein in Step (B), the communication server generates the watermark based on data of the first user account and the second user account that comprise usernames of the first user account and the second user account, user numbers of the first user account and the second user account, work departments of the first user account and the second user account, company names of the first user account and the second user account, or a combination of these.

4. The communication confidentiality method according to claim 1, further comprising:

Step (G): by the communication server, respectively sending warning information data to the first communication device and the second communication device, wherein the warning information data are used to notify that the confidential information data are sent by the second communication device to the third communication device.

5. The communication confidentiality method according to claim 1, wherein in Step (A), the watermark adding request is configured to display only the multimedia information data on the second communication device or to display both the watermark and the multimedia information data on the second communication device.

6. A communication confidentiality method, applied to a communication server, comprising:

Step (A): receiving a watermark adding request and multimedia information data from a source communication device, wherein the multimedia information data are later sent to a destination communication device;

Step (B): generating a watermark according to the watermark adding request, combining the watermark with the multimedia information data to generate confidential information data, and generating and storing confidential record data that correspond to the watermark and comprise one of a first user account of the source communication device, a second user account of the destination communication device, a date of sending the watermark adding request, and time of sending the adding watermark request or a combination of these;

Step (C): sending the confidential information data to the destination communication device, Step (D): receiving the confidential information data from another source communication device, wherein the confidential information data are later sent to another destination communication device;

Step (E): when detecting that the confidential information data comprise the watermark, the communication server generates and stores additional confidential record data that correspond to the watermark and comprise one of a third user account of the another source communication device, a fourth user account of the another destination communication device, a date of sending the confidential information data, and time of sending the confidential information data or a combination of these; and Step (F): sending the confidential information data to the another destination communication device.

* * * * *